Nov. 26, 1957

W. L. BULKLEY ET AL 2,814,070

PLASTIC EXTRUDER

Filed May 5, 1955

William L. Bulkley
Arthur A. Harban
John R. Krebs
Charles J. Ryant, Jr.
INVENTORS.

BY

Byron A. Vanes
ATTORNEY

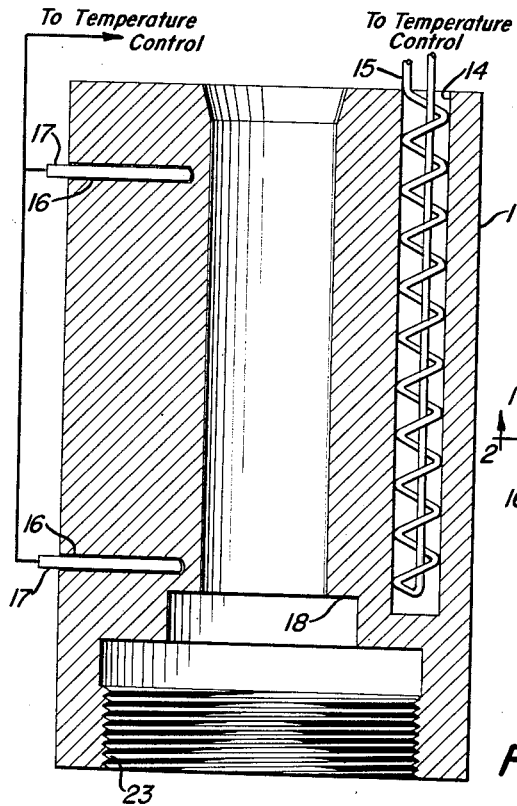
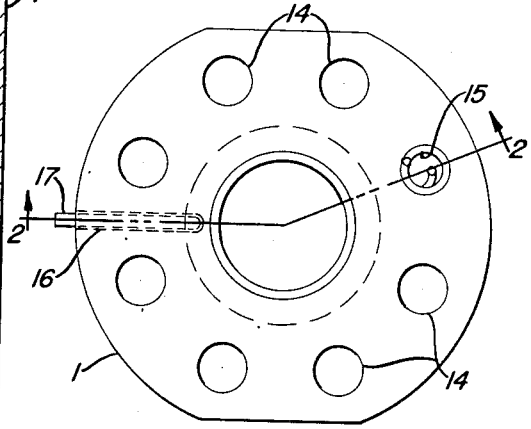
Fig. 2
Fig. 3
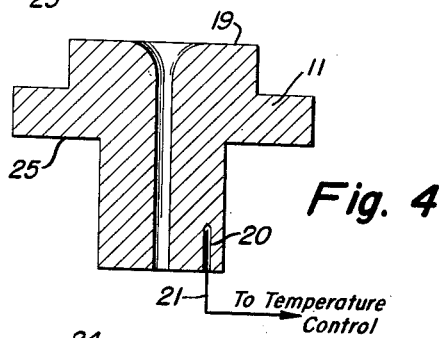
Fig. 4
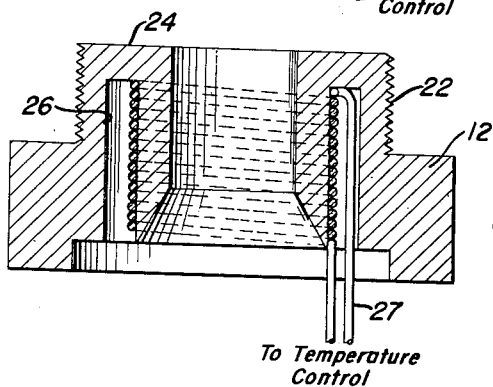
Fig. 5
William L. Bulkley
Arthur A. Harban
John R. Krebs
Charles J. Ryant, Jr.
INVENTORS.

2,814,070
PLASTIC EXTRUDER

William L. Bulkley, Munster, Ind., Arthur A. Harban, Park Forest, Ill., John R. Krebs, Indianapolis, Ind., and Charles J. Ryant, Jr., Chicago, Ill., assignors to Standard Oil Company, Chicago, Ill., a corporation of Indiana Application May 5, 1955, Serial No. 506,224

2 Claims. (Cl. 18—12)

This invention relates to a method and means for extruding plastic materials. More particularly, it relates to a micro-extruder suitable for laboratory testing and control work or small scale industrial extrusion.

The extrusion of plastic materials on a commercial scale has been carried out in relatively large machines and the plastic materials to be formed in particulate shapes have been fed to an appropriate die by means of an Archimedean screw. In most instances, the cylinder body of such machines has been heated to maintain the material in a plastic condition and in some instances the screws and dies have also been heated. Although machines of this type have been developed quite extensively for large scale commercial production, very little has been done in developing relatively smaller extruders useful for laboratory testing and control work or for small scale industrial extrusion. An example of such a small scale device now available is the extrusion plastometer described in ASTM: D1238–52T on pages 736–39 of Part 6 of "ASTM Standards" published in 1953 by the American Society for Testing Materials. In this device, a plastic material is charged to a vertical cylinder, and a plunger and weights on said plunger are used to force the material through a die disposed at the lower end of the cylinder. This entire apparatus is contained in a small furnace to provide the heat necessary to maintain the plastic material in a fluid condition. The temperature of the plastic is varied by regulating the heat input to the furnace. Melt viscosity or melt index is the only rheological property which may be obtained using such a device, and even this property may only be investigated over a small range inasmuch as the total weight which may be placed on the extruder plunger is limited by physical considerations. For instance, to investigate melt viscosity over the range of $10^4$ poises to $10^8$ poises, the weight necessary is in the range of 2 lbs. to 2,000 lbs. It is easily understood that it is not feasible to use weights in this range in an extruder of such small size.

Some further disadvantages of a device of the type just described are its poor temperature gradient and lack of flexibility due to the use of weights for the application of pressure to the plastic material; this requires that the extruder be in a vertical position which could be a distinct disadvantage in some instances.

In determining rheological properties of plastic materials such as melt viscosity or melt index, memory effect, etc., it is imperative that the temperature of the plastic material under test be maintained constant and that the temperature gradient throughout the sample be not more than about 1° C. It is also essential that the force exerted on the plastic material be maintained constant throughout such a determination. If these conditions are not met, the various rheological properties may not be determined with a reasonable degree of accuracy. It is also necessary that the range of pressures which may be applied to the plastic materials be of the order of about 10 p. s. i. g. to 2000 p. s. i. g. if the extruder is to be useful in determining physical properties of plastic materials which vary widely in molecular weight.

It is therefore an object of this invention to provide a device adaptable to handling various plastic materials and producing various shaped cross-sections. It is a further object to provide a device which is portable and capable of being operated with a minimum of labor and is useful for studying the rheological properties of plastic materials. Still another object is to provide a device so constructed that an adequate test may be made with a small sample. Yet another object is to provide a method of extruding plastic materials useful for laboratory testing or control work or small scale industrial extrusion. Another object is to provide an extruder so constructed that dies may be interchanged quickly and easily. A further object is to provide an extruder in which the pressure is applied by compressed gas from cylinders readily available in laboratories.

A more specific object is to provide a device for conducting constant force tests at various pressure levels. Another object is to provide a device with accurate temperature control particularly in the area surrounding the plastic specimen.

A more particular object is to provide a combination die heater and retainer ring on a device for extruding plastic materials. Yet another object is to provide a combination die cooler and retainer ring on a device for extruding plastic materials. Other and additional objects will become apparent to those skilled in the art as the description of the invention proceeds.

The objects of the invention are accomplished by providing a micro-extruder comprising a heated cylinder having one end adapted to receive a die and a combination heat exchanger and die retainer wherein the die protrudes substantially through and is in heat exchange relationship with the combination heat exchanger and die retainer. The combination heat exchanger and die retainer is provided with an annular channel which is in coaxial alignment with the die. Heat exchange means are placed in this channel for heating or cooling the die to maintain a preselected temperature of the plastic material as it is extruded through the die. A piston disposed in the cylinder for forcing the plastic material through the die is driven by a constant force means such as a pneumatically operated piston.

In the drawings referred to below, we have shown a preferred embodiment of our invention, it being understood that this is by way of example only.

Figure 2 is a side view section drawing of the extrusion cylinder.

Figure 3 is an end view section drawing of the extrusion cylinder.

Figure 4 is a section drawing of a rod-forming die.

Figure 5 is a section drawing of the combination heat exchanger and die retainer.

Figure 1:
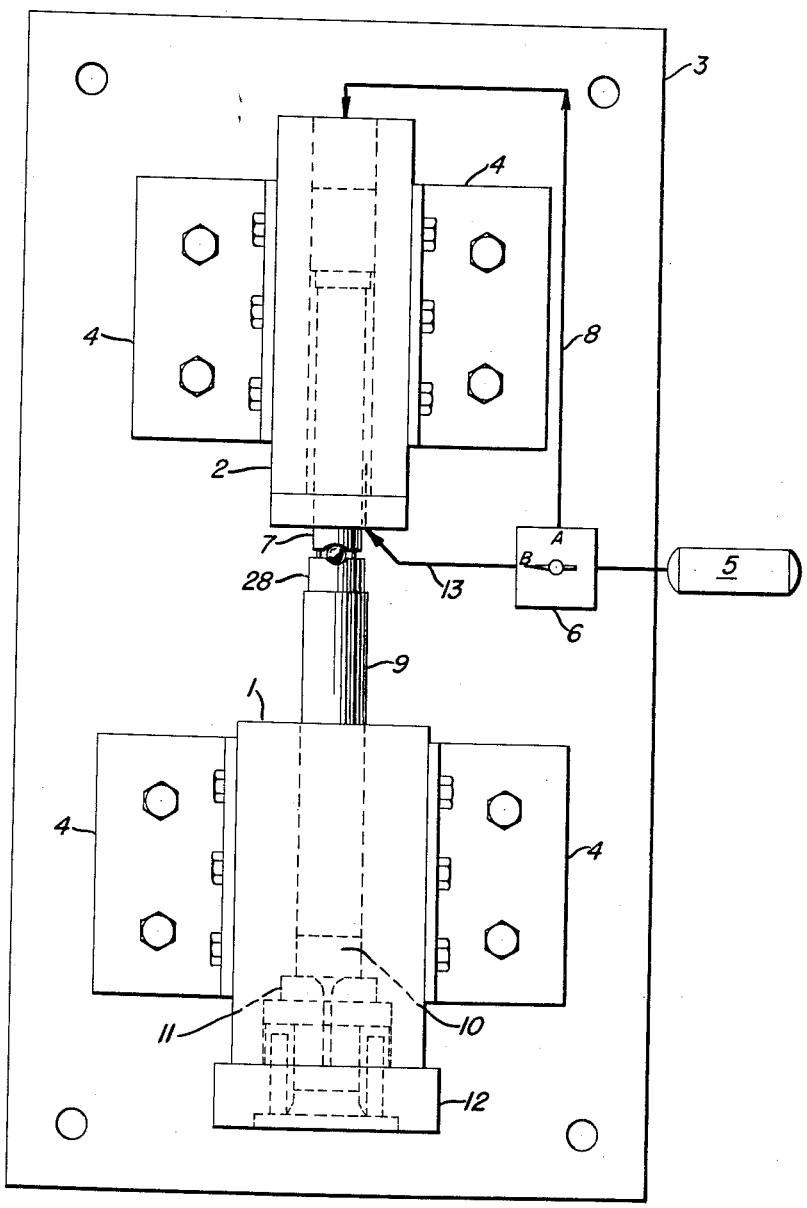
Figure 1 is a top plan view of the micro-extruder and pneumatically operated power cylinder.

Referring to Figure 1, the extruder cylinder 1 and the power cylinder 2 are attached to a base 3 by means of supports 4. The power cylinder piston 7 is actuated by means of a constant pressure source 5 such as compressed air or other gas through a valve 6. When the valve is in position A, pressure is exerted on the power cylinder piston 7 through line 8. The movement of power piston 7 forces the extrusion piston 9 forward in extrusion cylinder 1 thereby forcing plastic material 10 through die 11. An equalizer foot 28 is used at the juncture of power cylinder piston 7 and extrusion piston 9 to insure the application of an axial load on the extrusion piston. Other means may be used to accomplish this purpose, for instance, the power cylinder piston 7 and extrusion piston 9 may be constructed as an integral unit. It has been found most convenient, however, to fabricate these pistons as shown in the drawings. Disassembly for cleaning, charging plastic material, etc., are facilitated by such construction. The combination heat exchanger and die retainer ring 12 holds the die 11 in position and supplies the heat necessary to maintain the plastic material at the proper temperature while passing through the die.

After the plastic material 10 has been extruded, valve 6 is turned to the B position and power piston 7 is forced to the rear of power cylinder 2 through line 13.

In Figure 2, a detailed section drawing of the extrusion cylinder is shown. Wells 14 are provided for insertion of heating elements 15. Wells 16 are provided for insertion of thermocouples 17 which may be operatively connected to a temperature controlling device which will regulate the amount of heat input to the cylinder by means of heating elements 15. Other means may be used to heat the cylinder, for instance, an electrical heating coil may be applied directly to the outer surface of the cylinder. Thermostats or thermoregulators may be used to control the heat input.

Figure 3 is an end view section drawing of the extrusion cylinder showing more clearly the placement of the wells 14 and the heating elements 15 which are placed therein and the relationship of thermo wells 16 to heating wells 14.

Figure 4 shows a rod-forming die 11 which may be readily inserted in the end of extrusion cylinder 1. When placed in position, surface 18 in the cylinder bears against surface 19 on the die. A well 20 is also provided for the insertion of a thermocouple 21. Dies for forming various cross-sectional shapes may be provided. A sheet die, for instance, would be provided with a slit opening rather than a hole such as in the rod-forming die, and a tubing die would be provided with an annular opening. The external shape and dimensions of such dies should, of course, be identical so that they may be interchanged.

Figure 5 shows the combination heat exchanger and die retainer 12. Threads 22 are provided on the combination heat exchanger and die retainer which engage threads 23 inside cylinder 1 when positioned to retain the die in the cylinder. Surface 24 on the combination heat exchanger and die retainer engages surface 25 on the die, thus effectuating a seal between surfaces 18 and 19 on the extrusion cylinder and rod die, respectively. An annular channel 26 is provided in the combination heat exchanger and die retainer 12 in co-axial alignment with die 11. Electrical heating coil 27 is placed in the annular channel to provide the heat necessary for the particular material being extruded. Cooling coils could be placed in the annular channel 26 if it is desired to cool the plastic material as it is extruded. Other means could be used to secure the die heater and retainer to the extruder cylinder. It could be bolted, flanged, clamped or fastened by any other conventional means.

In operation, a specimen of plastic material in the form of a molded slug is inserted in the die end of the extruder 1 and the die 11 and combination heat exchanger and die retainer 12 are placed in position. The unit is then heated to the desired temperature level by means of cartridge heaters 15 and heating coil 27. This temperature is controlled with suitable temperature control instruments in conjunction with thermocouples 17 and 21. Of course, the unit may be at operating temperature before insertion of the sample and the sample may likewise be preheated before placing in the unit. After insertion of the sample, the unit is lined out at the proper temperature. When equilibrium temperature has been reached, the power cylinder piston 7 is moved toward the extruding unit by opening valve 6 to the A position. Proper operating pressure depends upon the characteristics of the plastic material being extruded, type of result desired (i. e. such as studying memory effect, melt viscosity, etc.) extrusion temperature, cross-sectional shape of extruded material, etc.

When the specimen has been completely extruded, the power cylinder piston 7 is returned to its original position by placing valve 6 in the B position, thus reversing the flow of pressuring medium. If desired, piston 7 and piston 9 may be readily attached to one another, thus permitting the extruder piston being returned to its original position at the same time the power cylinder piston is returned. As pointed out hereinbefore, it has been found expedient to keep the pistons separate so that extruder piston 9 may be easily removed for cleaning.

After returning the power cylinder piston 7 to its original position, the combination heat exchanger and die retainer 12 and the die 11 are removed from extrusion cylinder 1 and the unit is ready for recharging.

Dies for the unit may be made interchangeable and various shapes such as rod, tube, sheet and more complex cross sections may be produced. For instance, in studying memory effect of plastic materials, it is advantageous to use a tubing die having a spider with multiple passages for the plastic material. Those materials exhibiting memory effect show definite cross-sectional irregularities directly related to the spider openings.

Sheet dies are useful in determining whether plastic materials such as polyethylene are characterized by forming fish eyes when extruded. These fish eyes generally result from the presence of particles of more highly polymerized ethylene and the like. It has heretofore been very difficult to determine the presence of fish eyes on laboratory samples inasmuch as micro-extruders with adequate temperature control and pressure operating range have not been available and such fish eyes can not be discerned when polyethylene is compression molded into thin sheets rather than extruded.

In addition to being very valuable as a laboratory testing device and as a control device, the extruder disclosed herein is also very useful for small scale industrial extrusions. For instance, very small tubing on the order of 1 mm., with wall thicknesses of 0.1 mm. may be very accurately produced. One use of such tubing is in the manufacture of polystyrene sample tubes which may be used in connection with electron microscopy.

It is contemplated, of course, that plastic materials other than those specifically set forth herein may be extruded with this device. It is further contemplated that those skilled in the art may make various changes without departing from the spirit of the invention and therefore the invention is not limited to what is shown in the drawings or described in the specification but only as limited in the appended claims.

We claim:

1. An extruder for plastic materials comprising a cylinder having one end adapted to receive a die and a combination die heater and retainer, said die protruding substantially through and in heat exchange relationship with said combination die heater and retainer and said combination die heater and retainer having an annular channel in co-axial alignment with said die, electrical heating means in the annular channel of said die retainer, temperature sensing means to measure the temperature of said die, means for said temperature sensing means to control said electrical heating means, a piston slidably disposed in said cylinder, means for applying constant force to said piston to extrude said plastic materials through said die, electrical heating elements to heat said cylinder, a temperature sensing element to measure the temperature of said cylinder, and suitable means for said temperature sensing element to control said electrical heating elements.

2. The extruder of claim 1 which includes a well in said die, said temperature sensing means being disposed in said well.

(References on following page)

References Cited in the file of this patent

UNITED STATES PATENTS

| | | | |
|---|---|---|---|
| 635,026 | Saunders | Oct. 17, 1899 |
| 2,117,179 | Kopp | May 10, 1938 |
| 2,233,987 | Orsini | Mar. 4, 1941 |
| 2,366,417 | MacMillin | Jan. 2, 1945 |
| 2,405,039 | Jesionowski | July 30, 1946 |
| 2,508,988 | Bradley | May 23, 1950 |
| 2,587,930 | Uschmann | Mar. 4, 1952 |